US009514342B1

(12) United States Patent
Hosseini et al.

(10) Patent No.: US 9,514,342 B1
(45) Date of Patent: Dec. 6, 2016

(54) WEARABLE RADIO FREQUENCY IDENTIFICATION ENABLED DEVICES

(71) Applicants: Alister Hosseini, Long Beach, CA (US); Steve E. Trivelpiece, Rancho Santa Margarita, CA (US)

(72) Inventors: Alister Hosseini, Long Beach, CA (US); Steve E. Trivelpiece, Rancho Santa Margarita, CA (US)

(73) Assignee: Tyco Fire & Security GmbH, Neuhausen AM Rheinfall (CH)

( * ) Notice: Subject to any disclaimer, the term of this patent is extended or adjusted under 35 U.S.C. 154(b) by 0 days.

(21) Appl. No.: 14/743,301

(22) Filed: Jun. 18, 2015

(51) Int. Cl.
*H04Q 5/22* (2006.01)
*G08B 1/08* (2006.01)
*G08B 13/14* (2006.01)
*G08B 23/00* (2006.01)
*G06K 7/10* (2006.01)

(52) U.S. Cl.
CPC .................. *G06K 7/10415* (2013.01)

(58) Field of Classification Search
CPC .......... G06K 7/0008; G06K 7/10366; G06K 19/0723; G06K 19/07762; G06K 7/10128; G06Q 10/063114; G06Q 10/06316; G06Q 10/0833; G06Q 10/087; G06Q 10/10; G06F 2203/0331; G06F 3/014; G06F 3/0346; H04B 5/0012; H04B 5/0075
USPC .......... 340/10.1, 539.1, 539.11, 572.1, 573.1
See application file for complete search history.

(56) References Cited

U.S. PATENT DOCUMENTS

| 7,504,949 | B1* | 3/2009 | Rouaix | G06Q 10/06 235/375 |
|---|---|---|---|---|
| 2002/0044058 | A1* | 4/2002 | Heinrich | G06K 7/0008 340/572.1 |
| 2006/0044112 | A1* | 3/2006 | Bridgelall | G06K 17/0022 340/10.1 |
| 2009/0266898 | A1* | 10/2009 | Miller | G06K 7/0004 235/472.01 |
| 2012/0111950 | A1* | 5/2012 | Worrall | G06K 19/07762 235/488 |
| 2014/0249944 | A1* | 9/2014 | Hicks | G06K 7/10891 705/17 |
| 2014/0320265 | A1* | 10/2014 | Jones | G06Q 10/0833 340/10.1 |
| 2015/0130698 | A1* | 5/2015 | Burgess | G06F 1/163 345/156 |

* cited by examiner

*Primary Examiner* — Emily C Terrell
(74) *Attorney, Agent, or Firm* — Fox Rothschild LLP; Robert J. Sacco; Carol E. Thorstad-Forsyth

(57) ABSTRACT

Systems (100) and methods (900) for reading Radio Frequency Identification ("RFID") tags. The methods comprise: coupling a wearable RFID tag reader directly to a person's hand or forearm; transmitting a first interrogation signal from a first antenna of the wearable RFID tag reader being worn on a person's hand or forearm; receiving, by the wearable RFID reader, a first response signal generated by and transmitted from a first RFID tag in response to the first interrogation signal; and processing the first response signal to identify, locate or track a first object of interest.

20 Claims, 8 Drawing Sheets

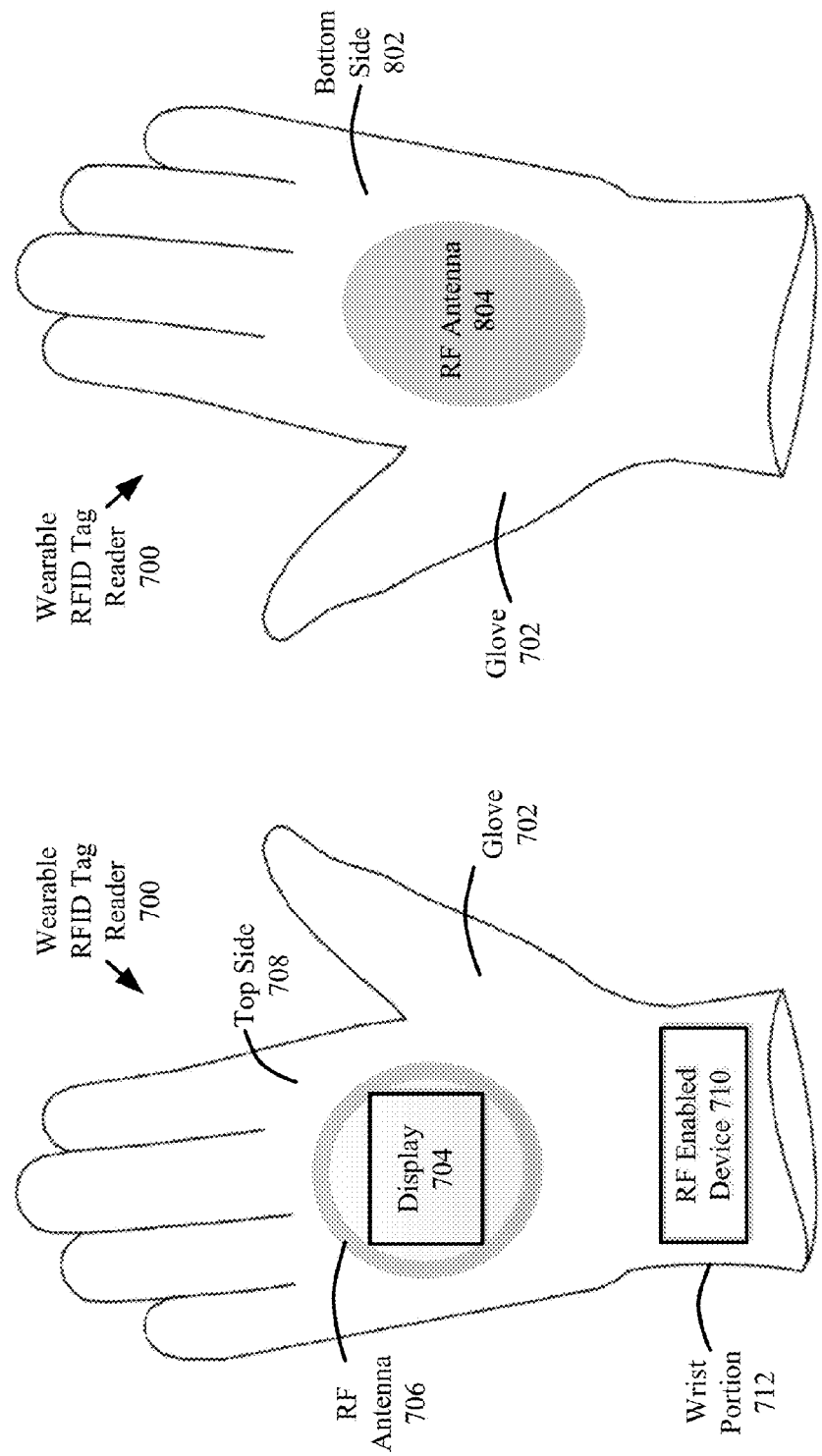

WEARABLE RADIO FREQUENCY IDENTIFICATION ENABLED DEVICES

FIELD OF THE INVENTION

This document relates generally to Radio Frequency Identification ("RFID") based systems. More particularly, this document relates to wearable devices that are RFID enabled.

BACKGROUND OF THE INVENTION

RFID technology has conventionally been used in the identification and tracking of products, equipment, and other articles. For example, RFID systems are commonly used in Electronic Article Surveillance ("EAS") and in logistical and inventory systems for monitoring goods and equipment and recording information on the target item. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

The RFID technology allows business owners and other persons to rapidly and/or continuously (a) identify products, assets and people, (b) count products, assets and people, and (c) track locations of products, assets and people. As such, the RFID technology offers significant benefits over a physical inventory counting process. By leveraging the RFID technology to increase inventory accuracy, retailers are better able to perform replenishment, service customer requests, manage product recalls or any other activities that rely on inventory data. Products on the market today to aid in determining a product's identification and/or location are too expensive, bulky and/or heavy. For example, some handheld RFID tag readers are bulky, heavy and need to be physically carried by a person through a facility. Cellphone integrated RFID tag readers are expensive since a special dongle is needed for enabling the RFID tag reading operations.

Additionally, fixed RFID tag detachers/deactivators have been an important part of EAS/RFID systems for detaching/deactivating RFID tags after successful purchases of articles coupled thereto. The fixed RFID tag detachers/deactivators are configured to detect only RFID tags being processed by a cashier while ignoring (i.e., filtering them out in the processing or controlling the antenna to have limited read range enough for an intended tag) other RFID tags located in a surrounding environment. This is difficult to obtain due to electromagnetic and RF antenna characteristics (e.g., if the antenna gain/power reduced, the ability to detect badly-oriented and/or loaded RFID tags (i.e., requiring more power to read the RFID tag) is reduced). On the other hand, if the Effective Isotropic Radiated Power ("EIRP") increases, non-desired RFID tags around the fixed RFID tag detachers/deactivators are detected which increases the processing time and thus slows down the check-out process.

Finally, fixed RFID detacher devices are being designed and built using two different RFID antennas, namely a low-power near-field antenna and a high-power far-field antenna. In these applications, the cashier brings the items (with the RFID tags attached thereto) in close proximity to the antenna in order to detect the RFID tags. This is difficult when the items are large, heavy and/or hard to handle.

SUMMARY OF THE INVENTION

The present disclosure concerns implementing systems and methods for reading RFID tags. The methods involve: coupling a wearable object (e.g., a waistband or glove) directly to a person's hand or forearm; transmitting a first interrogation signal from a first antenna of an RFID tag reader disposed on or in the wearable object being worn on the person's hand or forearm; receiving, by the RFID tag reader, a first response signal generated by and transmitted from a first RFID tag in response to the first interrogation signal; and processing the first response signal to identify, locate or track a first object of interest to which the first RFID tag is attached.

In some scenarios, the wearable object comprises a wristband and/or a glove. If the wearable object comprises a wristband, then the first antenna comprises a near-field antenna disposed on the wristband (radiating in near-field region over the wristband far from the human body). If the wearable object comprises a wristband and a glove, then the first antenna comprises a far-field antenna disposed on a glove communicatively coupled to the wristband. The far-field antenna is backed by a reflective layer in between the radiating element and the human body. If the wearable object comprises a glove, then the first antenna comprises a near-field antenna disposed on the glove so as to reside adjacent a person's dorsum of the hand when worn thereby.

The methods may also involve: transmitting a second interrogation signal from a second antenna of the RFID tag reader; receiving, by the RFID tag reader, a second response signal generated by and transmitted from a second RFID tag in response to the second interrogation signal; and processing the response signal to identify, locate or track a second object of interest. In this case, the second antenna comprises a far-field antenna disposed on the glove so as to reside adjacent a person's palm when worn thereby. The far-field antenna is backed by a reflective layer.

DESCRIPTION OF THE DRAWINGS

Embodiments will be described with reference to the following drawing figures, in which like numerals represent like items throughout the figures, and in which:

FIGS. 7-8 each provide an illustration of an exemplary architecture for a wearable RFID tag reader.

DETAILED DESCRIPTION OF THE INVENTION

Figure 1:
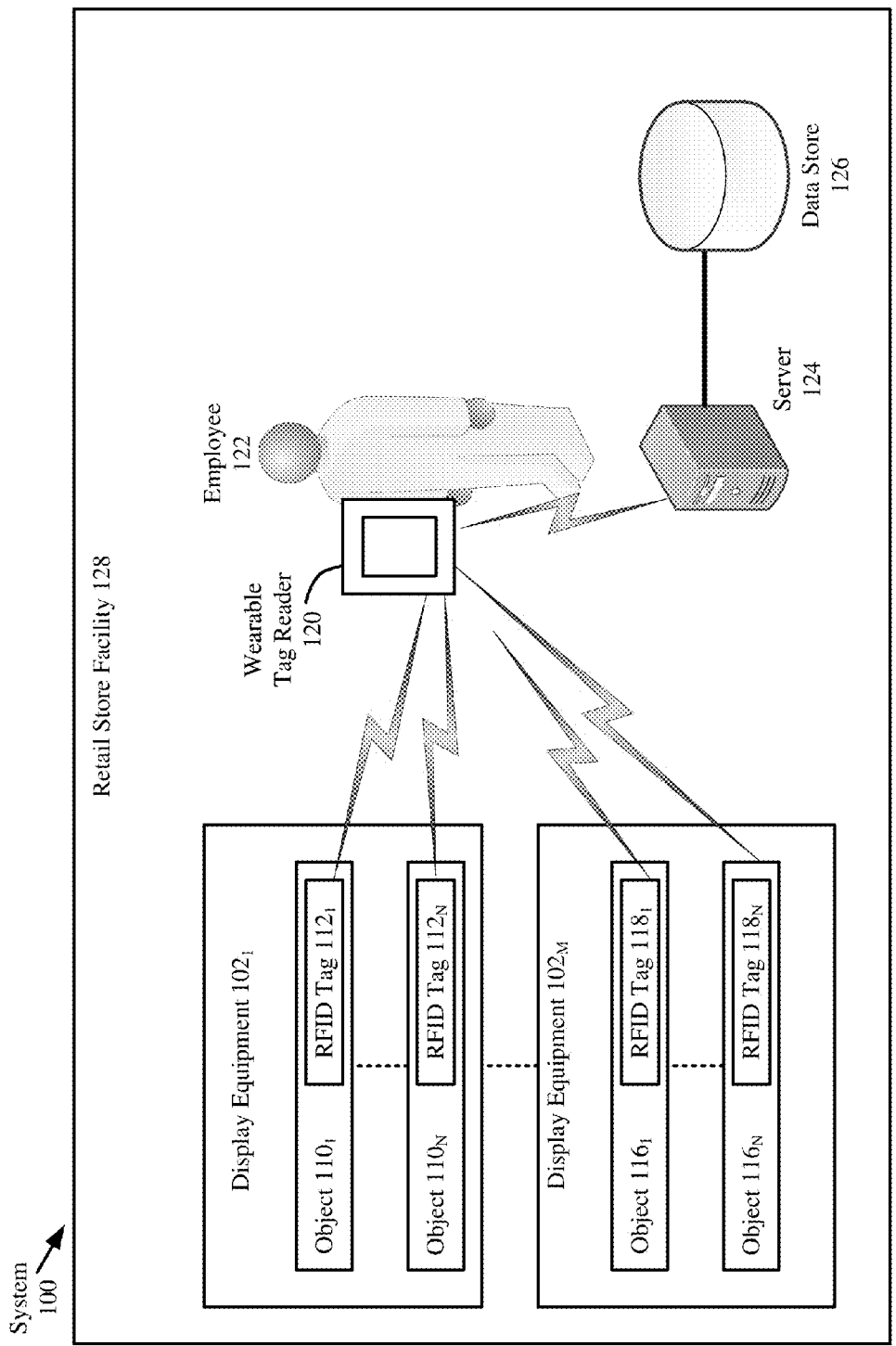
FIG. 1 is an illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

This document concerns RFID-enabled wearables for identifying, locating and/or tracking items or people in a given area. In some scenarios, the RFID-enabled wearables include wristbands (e.g., a hand watch) equipped with additional processing capabilities, RFID add-on units, input devices (e.g., a touch screen display), output devices (e.g., a display), and RFID antennas for RFID detection of RFID tags. Since each wristband can expose a person's wrist to RF radiation, the wristband is equipped with a low-power near-field antenna (e.g., loop antenna) for near-field and close-range RFID scanning and detection. During use, the wearer passes an item over the wristband to detect the RFID tag.

For heavier items and/or items with loaded RFID tags (i.e., requiring more power to read the RFID tags), a high-power far-field antenna (e.g., a small patch antenna) can be used. In this regard, the RFID-enabled wearables may additionally or alternatively comprise a glove with a high-power far-field antenna coupled to the palm thereof. Notably, in the form-factor, the high-power far-field antenna is backed by a reflective layer in order to remove the back radiation to the wearer's hand. In some scenarios, the glove comprises an RFID enabled device. In other scenarios, the glove only comprises the high-power far-field antenna, and therefore is absent of an RFID enabled device. In this case, the high-power far-field antenna is coupled to the electronics of the wristband via a wired or wireless communications link. The wireless communications link can include, but is not limited to, a Near Field Communication ("NFC") link (e.g., Bluetooth).

As evident from the above discussion, this disclosure proposes a variety of RFID enabled wearable devices which can be used to detect RFID tags in a mobile format. The proposed RFID enabled wearable devices are desirable since they provide comfortable solutions for mobile RFID readers. The RFID enabled wearable devices can replace conventional fixed RFID readers and conventional handheld RFID readers (e.g., those that are relatively costly, bulky and/or heavy).

Exemplary System

Referring now to FIG. 1, there is provided a schematic illustration of an exemplary system 100 that is useful for understanding the present invention. The system 100 is generally configured to allow improved product identification, counting and tracking within a retail store environment using RFID communication technology. Although the present invention is described herein in relation to a retail store environment, it is not limited in this regard. The present invention can be employed in any environment in which objects need to be located, counted and/or tracked.

As shown in FIG. 1, system 100 comprises a Retail Store Facility ("RSF") 128 in which display equipment $102_1, \ldots, 102_N$ is disposed. The display equipment is provided for displaying objects $110_1\text{-}110_N$, $116_1\text{-}116_N$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

RFID tags $112_1\text{-}112_N$, $118_1\text{-}118_N$ are respectively coupled to the objects $110_1\text{-}110_N$, $116_1\text{-}116_N$. The RFID tags are described herein as comprising single-technology tags that are only RFID enabled. The present invention is not limited in this regard. The RFID tags can alternatively or additionally comprise dual-technology tags that have both EAS and RFID capabilities. In all scenarios, the RFID tags comprise circuitry for assisting store personnel with determining the identities and/or locations of objects within the RSF 128. The manner in which the RFID tags provide such assistance will become evident as the discussion progresses.

Figure 2:
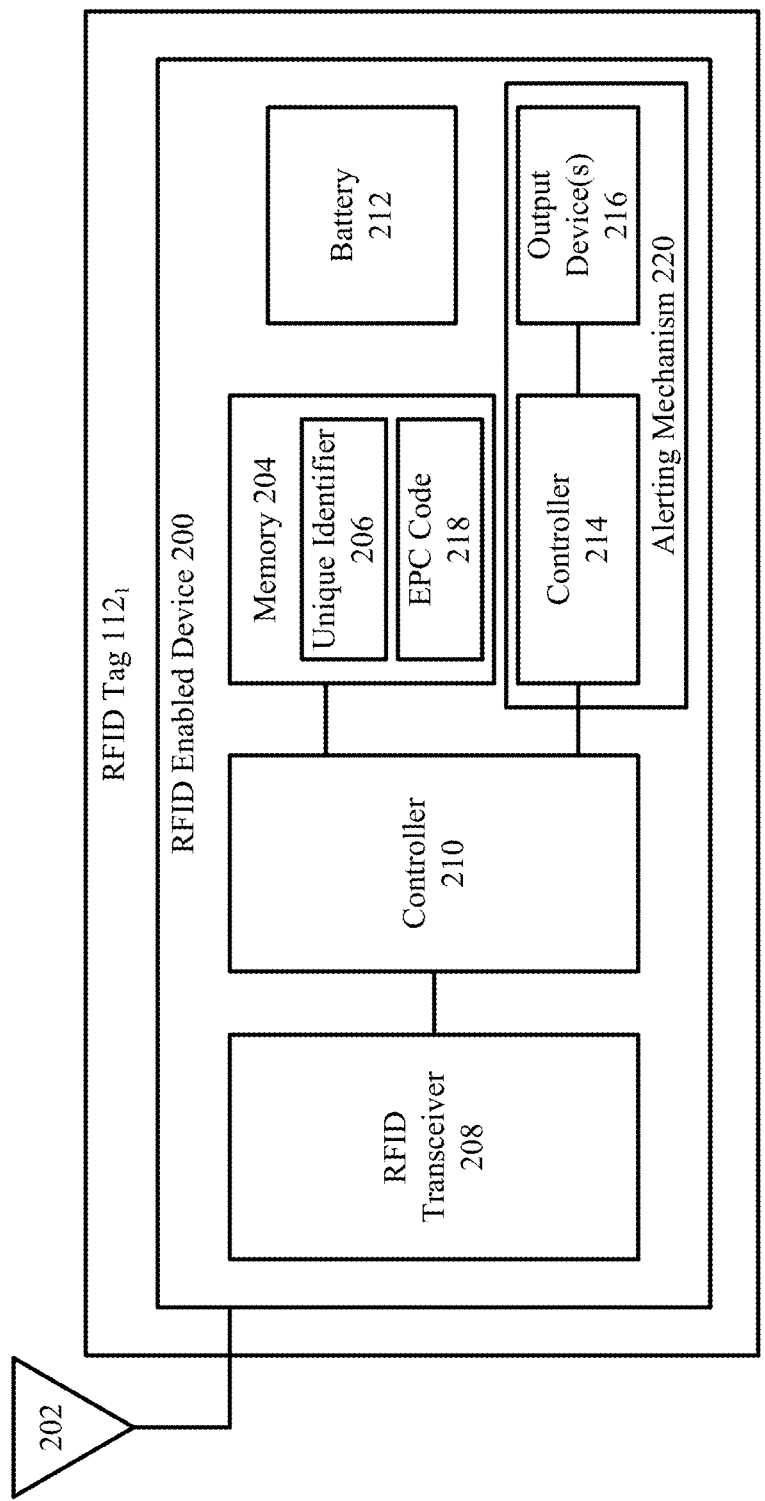
FIG. 2 is a block diagram of an exemplary architecture for an RFID tag.

A detailed block diagram of RFID tag $112_1$ is provided in FIG. 2. RFID tags $112_N$, $118_1\text{-}118_N$ are the same as or similar to RFID tag $112_1$. As such, the discussion of RFID tag $112_1$ is sufficient for understanding the other RFID tags $112_N$, $118_1$-$118_N$. RFID tag $112_1$ may include more or less components that that shown in FIG. 2. However, the components shown are sufficient to disclose an illustrative embodiment implementing the present invention. Some or all of the components of the RFID tag $112_1$ can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an embodiment of a representative RFID tag $112_1$ configured to facilitate improved object locating within an RSF 128. In this regard, the RFID tag $112_1$ comprises an RFID enabled device 200 for allowing data to be exchanged with an external device (e.g., RFID reader 120 of FIG. 1) via RFID technology. The components 204-218 shown in FIG. 2 may be collectively referred to herein as the RFID enabled device 200, and include a power source 212 (e.g., a battery).

The RFID enabled device 200 comprises an antenna 202 for allowing data to be exchanged with the external device via RFID technology. The external device may comprise RFID reader 120 of FIG. 1. RFID reader 120 may be a fixed RFID reader or a portable RFID reader (e.g., a wearable RFID reader). In this case, the antenna 202 is configured to receive RF carrier signals (or interrogation signals) from the RFID reader 120 and/or transmit data response signals (or authentication reply signals) generated by the RFID enabled device 200. In this regard, the RFID enabled device 200 comprises an RFID transceiver 208. RFID transceivers are well known in the art, and therefore will not be described herein. However, it should be understood that the RFID transceiver 208 receives RF carrier signals (or interrogator signals) including first information from RFID readers, and forwards the same to a logic controller 210 for extracting the first information therefrom. If the first information indicates that the RF request signal (or interrogator signal) was directed to the RFID tag $112_1$ or a group to which the RFID tag $112_1$ belongs, then the logic controller 210 generates a data response signal (or authentication reply signal) encoded with second information stored in a memory 204. The second information can include, but is not limited to, a unique identifier 206 of the RFID tag $112_1$ and/or an Electronic Product Code ("EPC") 218 associated with an object to which the RFID tag $112_1$ is affixed. The data response signal (or authentication reply signal) is transmitted from the RFID tag $112_1$ to the RFID reader via RFID transceiver 208 and antenna 202.

The RFID tag $112_1$ also comprises an alerting mechanism 220. The alerting mechanism 220 provides a means for assisting store personnel with locating the object $112_1$ (to which it is attached) within the RSF 128. In this regard, the alerting mechanism 220 includes a controller 214 and output devices 216 for outputting auditory, visual and/or tactile alerts. The output devices 216 can include, but are not limited to, speakers, Light Emitting Diodes (LEDs), and vibrators. At least one alert is output from output device(s) 216 when the RFID tag receives an RF request signal (or interrogator signal) from an RFID reader that is directed thereto or to a group of RFID tags to which it belongs. The alert directs the store personnel's attention directly to the object to which the RFID tag $114_1$ is attached and/or provide the store personnel with an indication that the RFID tag has been successfully read by the RFID reader. Notably, the alert can be terminated under certain conditions. These conditions may either be configured within the device (e.g., time out configured) or occur when the RFID tag $112_1$ is no longer in the read field of the RFID reader. In some scenarios, the alert continues until expiration of a time period even when the RFID tag $112_1$ is no longer in the read field of the RFID reader. When the RFID tag $112_1$ is in the read field of the RFID reader, the alert may only be terminated in response to a termination command or signal.

The Air Interface Protocol ("AIP") standard defines the method by which RFID readers communicate with compliant RFID tags. The controller 214 is operative to interface with existing RFID tag's electrical circuitry, as well as understand when the RFID tag is communicating with a requesting RFID reader. Based on whether or not the RFID tag $112_1$ is being requested by the RFID reader 120, the controller 214 may perform operations to cause the output devices 216 to be enabled or activated so as to draw the attention of store personnel thereto.

Notably, memory 204 may be a volatile memory and/or a non-volatile memory. For example, the memory 204 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Figure 3:
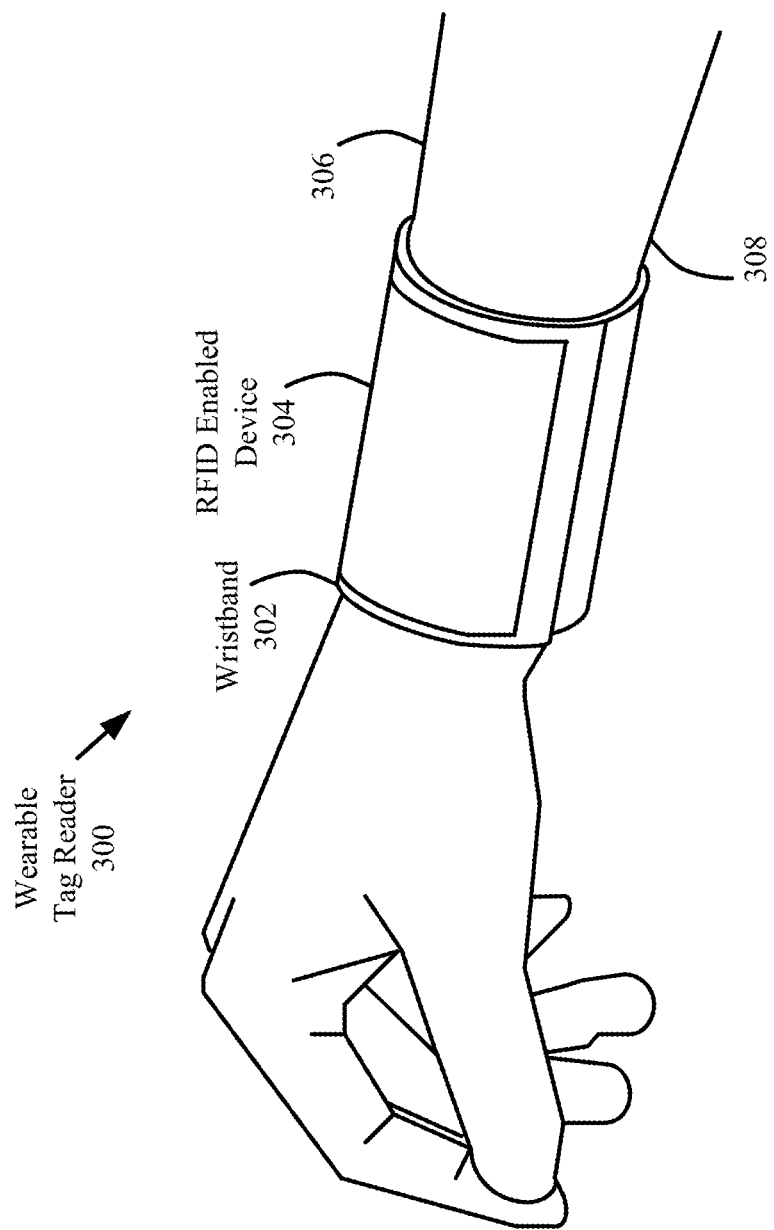
FIG. 3 is a block diagram of an exemplary architecture for a wearable RFID reader.

Referring now to FIG. 3, there is provided an illustration of an exemplary wearable RFID reader 300. Wearable RFID reader 120 of FIG. 1 may be the same as or similar to the wearable RFID reader 300. Thus, the discussion of wearable RFID reader 300 is sufficient for understanding wearable RFID reader 120.

As shown in FIG. 3, the wearable RFID reader 300 comprises a wristband. The wristband includes a strip of material worn around the wrist of a person (e.g., employee 122 of FIG. 1). An RFID enabled device 304 is coupled to the strip of material. The RFID enabled device 304 may be located on the strip of material so as to be at least partially adjacent to a top surface 306 of a wearer's forearm and/or a bottom surface 308 of the wearer's forearm.

The RFID enabled device 304 is generally configured to read RFID tags (e.g., RFID tags $112_1$-$112_N$, $118_1$-$118_N$ of FIG. 1) located in proximity thereto. A detailed block diagram of the RFID enabled device 304 is provided in FIG. 4. Notably, RFID enabled device 304 can include more or less components than that shown in FIG. 4. However, the components shown are sufficient to disclose an illustrative embodiment implementing the present invention. Some or all of the components of the RFID enabled device 304 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

Figure 4:
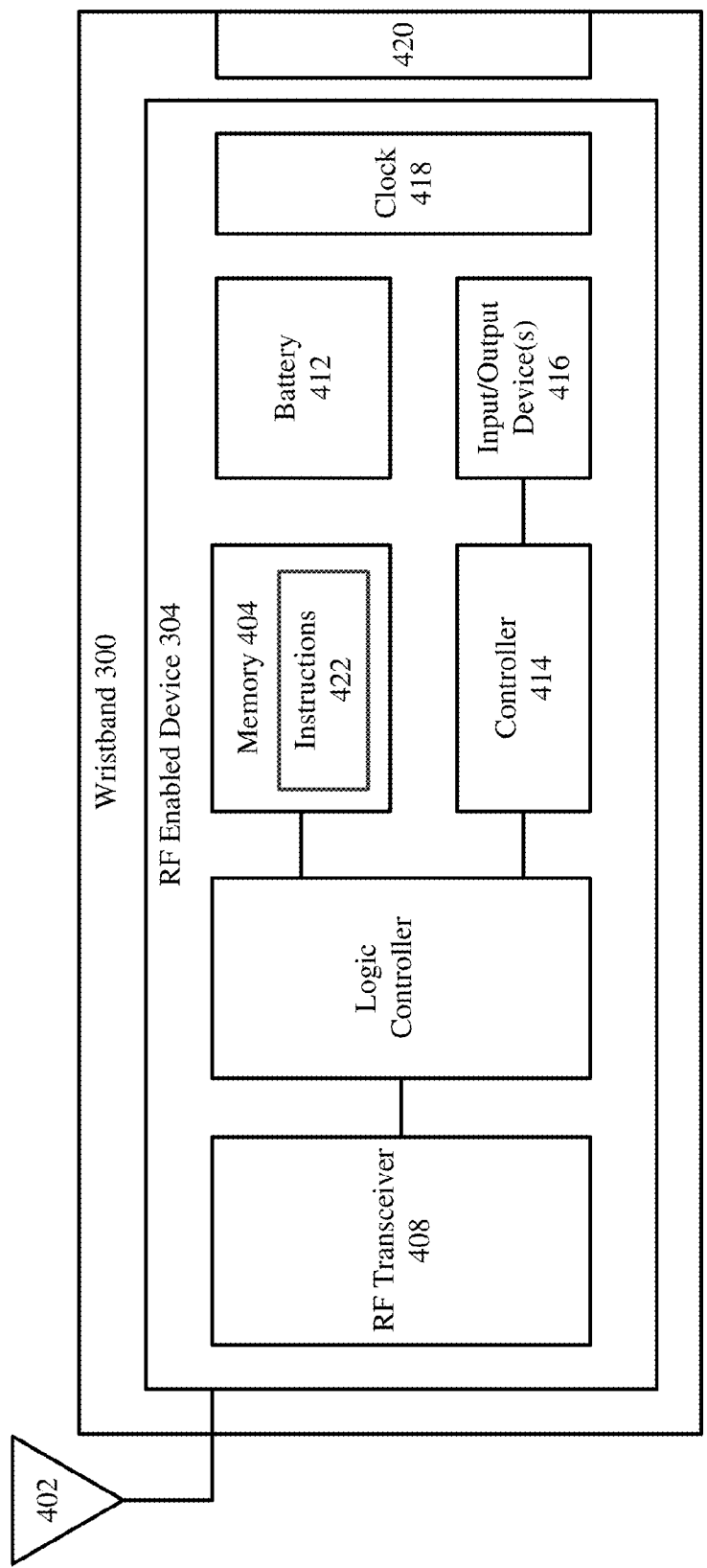
FIG. 4 is a detailed block diagram of an exemplary architecture for the wearable RFID tag reader shown in FIG. 2.

The hardware architecture of FIG. 4 represents an embodiment of a representative RFID enabled device 304 configured to facilitate improved object identification, locating and tracking within an RSF 128. In this regard, the RFID enabled device 304 is configured for allowing data to be exchanged with an external device (e.g., RFID tags $112_1$-$112_N$, $118_1$-$118_N$ and/or a server 124 of FIG. 1) via RFID technology. The components 404-418 shown in FIG. 4 may be collectively referred to herein as the RFID enabled device 304, and include a power source 412 (e.g., a battery), a memory 404 and a clock 418. Memory 404 may be a volatile memory and/or a non-volatile memory. For example, the memory 404 can include, but is not limited to, RAM, DRAM, SRAM, ROM and flash memory. The memory 404 may also comprise unsecure memory and/or secure memory.

The RFID enabled device 304 comprises an antenna 402 for allowing data to be exchanged with the external device via RFID technology. The antenna 402 is configured to receive RFID signals from the external device and/or transmit RFID signals generated by the RFID enabled device 304. In some scenarios, the antenna 402 comprises a low-power near-field antenna. The low-power near-field antenna includes, but is not limited to, a chip antenna or a loop antenna.

The RFID enabled device 304 also comprises an RF transceiver 408. RF transceivers are well known in the art, and therefore will not be described herein. However, it should be understood that the RF transceiver 408 generates and transmits RF carrier signals to RFID tags (e.g., RFID tags $112_1$-$112_N$, $118_1$-$118_N$ of FIG. 1), as well as receives data response signals (or authentication reply signal) transmitted from the RFID tags. In this way, the RFID enabled device 304 facilitates the identification, location and/or tracking of objects (e.g., objects $110_1$-$110_N$, $116_1$-$116_N$ of FIG. 1) to which the RFID tags are coupled.

Information associated with the identification, location and/or tracking of objects can be stored in memory 404 of the RFID enabled device 304 and/or communicated to other external devices (e.g., server 124 and data store 126 of FIG. 1) via interface 420 (e.g., an Internet Protocol or cellular network interface). For example, the RFID enabled device 304 can communicate information specifying received RFID tag identifiers and associated timestamps to a server. The server can then store the information in a database so as to collect RFID tag read data. The RFID tag read data can be subsequently used to: complete a purchase transaction; determine the last known position of a particular object within the RSF; and/or facilitate better locating of a particular object in response to a future request.

The RFID enabled device 304 also comprises a controller 414 and input/output devices 416. The input/output devices can include, but are not limited to, a touch screen display, a keypad and/or light emitting diodes. The touch screen display may be used to monitor the RFID detection activity of the RFID enabled device 304. For example, textual symbol(s) and/or graphic symbol(s) is(are) displayed on the touch screen display indicating that an RFID tag attached to a particular object has been successfully read by the RFID enabled device 304.

Notably, the wristband 300 can expose a person's wrist to RF radiation. As such, the wristband is equipped with a low-power near-field antenna (e.g., loop antenna) for near-field and close-range RFID scanning and detection. During use, the wearer passes an item over the wristband to detect the RFID tag.

Figure 5:
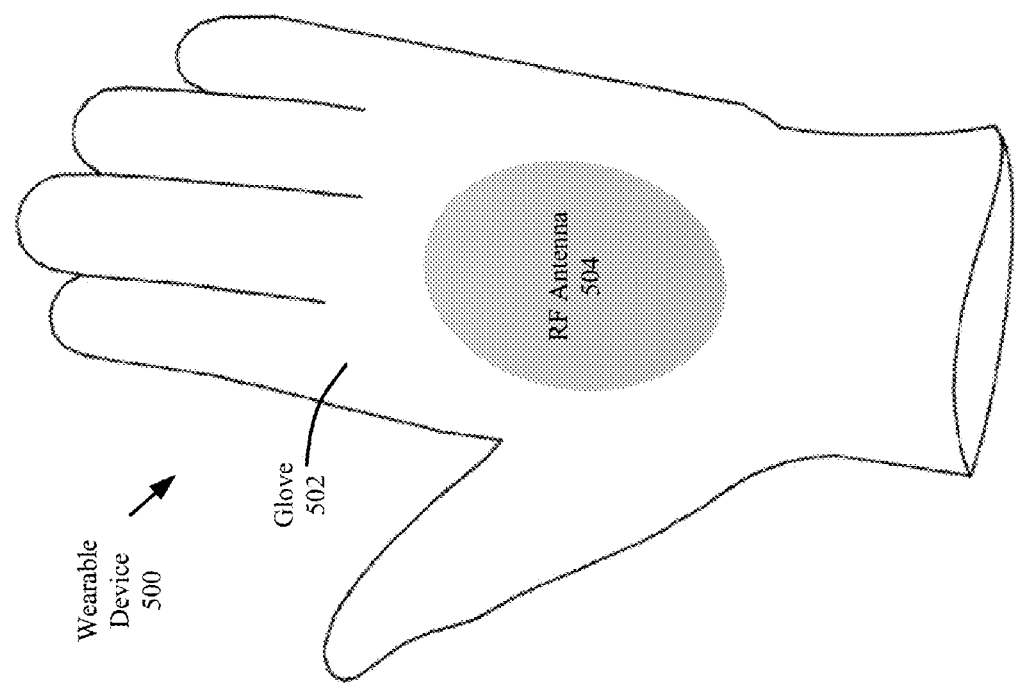
FIG. 5 is an illustration of an exemplary wearable RFID antenna on the palm of the hand radiating away from the hand.

For heavier items and/or items with loaded RFID tags (i.e., requiring more power to read the RFID tags), a high-power far-field antenna (e.g., a small patch antenna) can be used. In this regard, a wearable device comprising a high-power far-field antenna can alternatively or additionally be employed. An illustration of an exemplary architecture for such a wearable device is provided in FIG. 5. As shown in FIG. 5, the wearable device 500 comprises a glove 502 with an RF antenna 504 attached to the palm thereof.

The RF antenna 504 is a high-powered far-field antenna. The RF antenna 504 is backed by a reflective layer in order to remove the back radiation to the wearer's hand.

Figure 6:
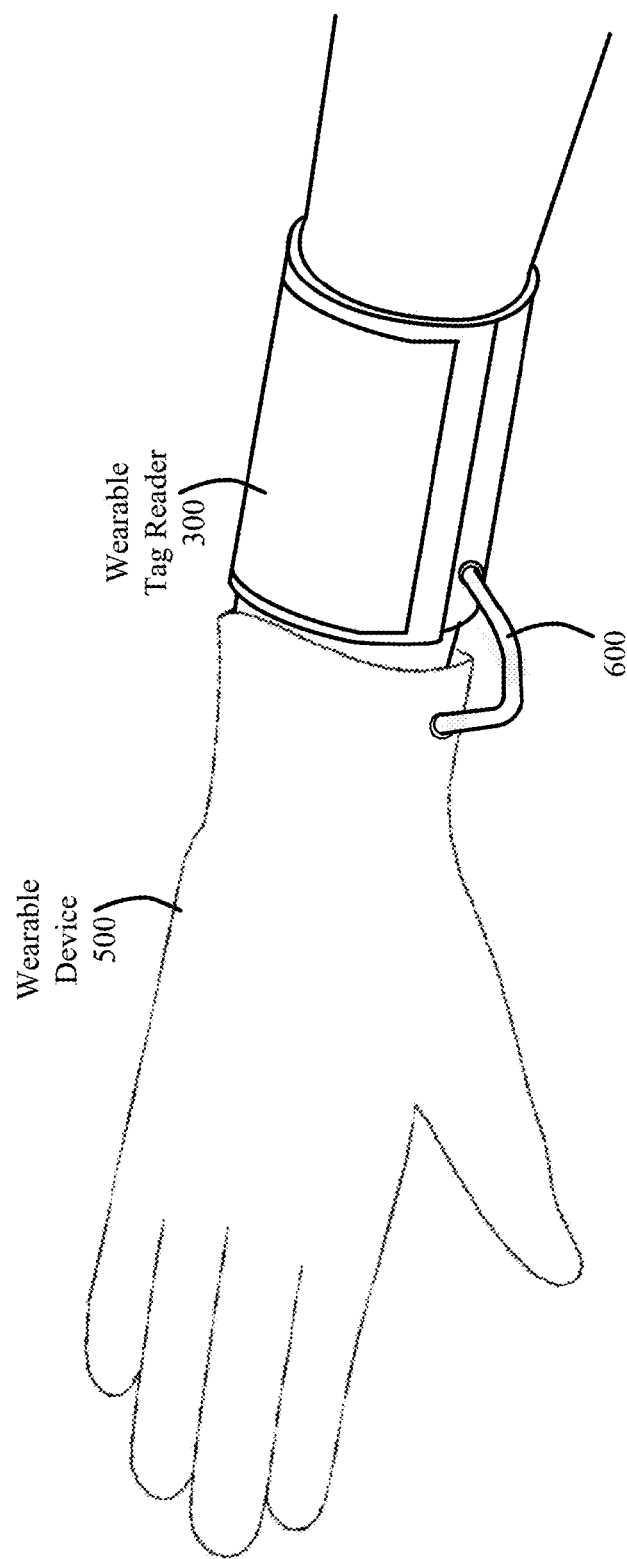
FIG. 6 is an illustration of that is useful for understanding how two different wearable devices (e.g., a wristband and a glove) interoperate.

Notably, the wearable device 500 is absent of an RF enabled device. As such, the RF antenna 504 can be coupled to a wristband tag reader (e.g., a wristband tag reader 300 of FIG. 3). For example, the RF antenna 504 of the wearable device 500 is electrically coupled to the RF enabled device (e.g., RF enabled device 304 of FIGS. 3-4) of the wristband tag reader via a wired connection 600 as shown in FIG. 6 or a wireless connection (not shown). The wireless connection can include, but is not limited to, a Near Field Communication ("NFC") connection (e.g., Bluetooth). In this way, RF signals received by the RF antenna 504 are communicated to the RF enabled device (e.g., RF enabled device 304 of FIGS. 3-4) of the wristband tag reader. Similarly, RF signals generated by the wristband tag reader are communicated to the wearable device 500 for transmission therefrom.

Referring now to FIGS. 7-8, there is provided illustrations that are useful for understanding another exemplary wearable RFID tag reader 700. Wearable RFID tag reader 700 comprises a glove 702 having a top side 708 and a bottom side 802. A display 704 and a first RF antenna 706 are disposed on the top side 708 of the glove 702 so as to reside adjacent a person's dorsum of the hand when worn thereby. The first RF antenna 706 comprises a low-power near-field antenna. A second RF antenna 804 is disposed on the bottom side 802 of the glove so as to reside adjacent a person's palm when worn thereby. The second RF antenna 804 comprises a high-power far-field antenna. The second RF antenna 804 is backed by a reflective layer in order to remove the back radiation to the wearer's hand.

An RF enabled device 710 is disposed on the wrist portion 712 of the glove 702. The RF enabled device 710 is the same as or similar to RF enable device 304 of FIG. 4. As such, the discussion provided above in relation to RF enabled device 304 is sufficient for understanding RF enabled device 710.

In some scenarios, the RF enabled device 710 is disposed on the top side 708 of the glove 702 as shown in FIG. 7. Alternatively, the RF enabled device 710 is disposed on the bottom side 802 of the glove (not shown). Notably, there are certain advantages to including the RF enabled device 710 on the top side 708 of the glove 702. For example, there is a relatively lower possibility of damage to the RF enabled device 710 when placed on the top side 708 of the glove 702 as opposed to the bottom side 802 of the glove.

Although the above discussion focused on wristbands and gloves. The present invention is not limited in this regard. Other types of wearable items can be employed for use in providing a wearable RFID reader. For example, a belt, collar, shoe, or smart card can be alternatively or additionally be employed for implementing the RFID enabled device, low-power near-field antenna, and/or high-power far-field antenna.

Figure 9:
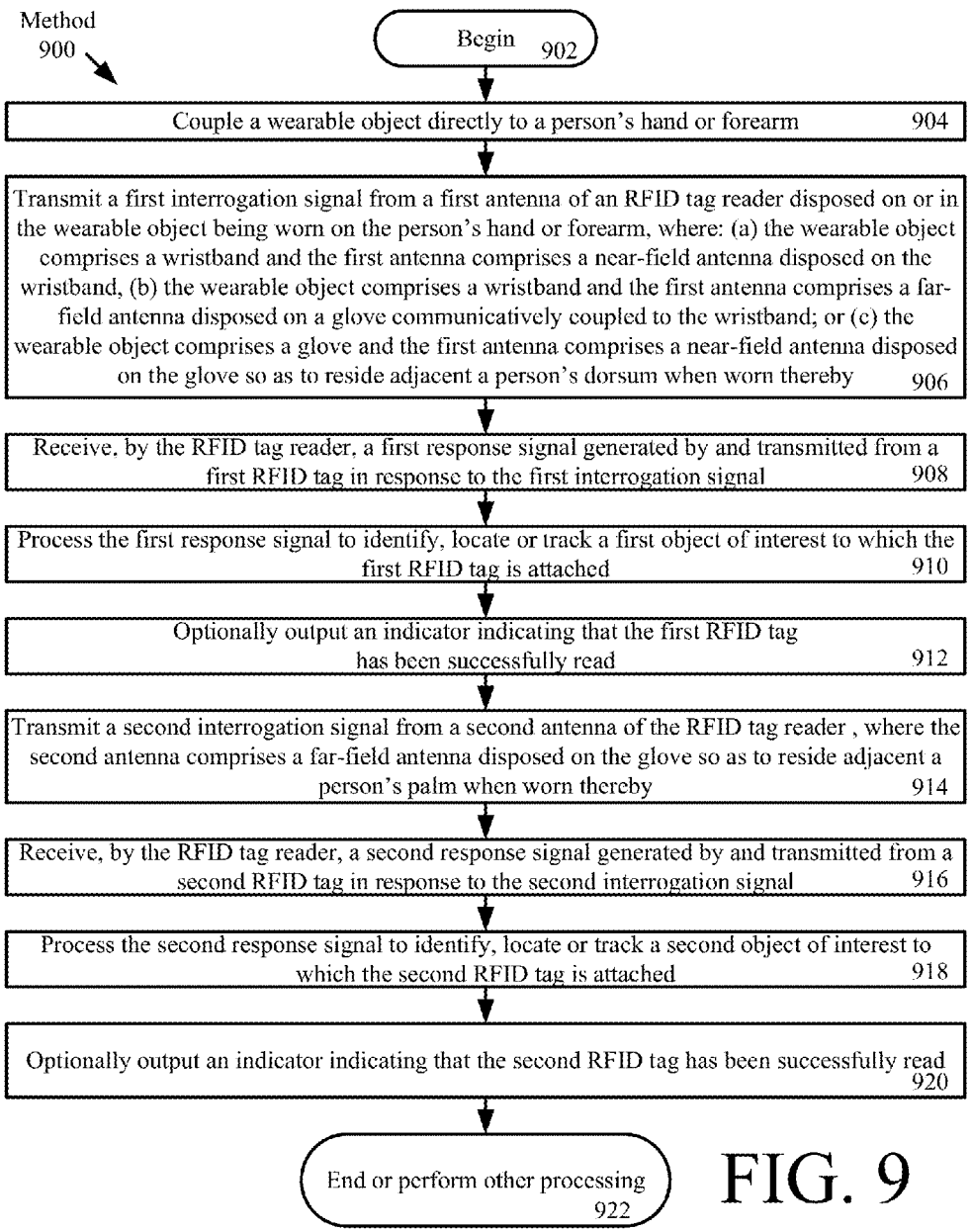
FIG. 9 is a flow diagram of an exemplary method for reading RFID tags.

Referring now to FIG. 9, there is provided a flow diagram of an exemplary method 900 for reading Radio Frequency Identification ("RFID") tags (e.g., RFID tags $112_1$, . . . , $112_N$, $118_1$, . . . , $118_N$ of FIG. 1). Method 900 beings with step 902 and continues with step 904 where a wearable object (e.g., wristband 302 of FIG. 3, glove 500 of FIG. 5 or glove 702 of FIG. 7) is coupled directly to a person's hand or forearm. Thereafter, steps 906-910 are performed. These steps involve: transmitting a first interrogation signal from a first antenna of an RFID tag reader disposed on or in the wearable object being worn on a person's hand or forearm; and receiving, by the RFID tag reader, a first response signal generated by and transmitted from a first RFID tag in response to the first interrogation signal; and processing the first response signal to identify, locate or track a first object of interest to which the first RFID tag is attached. In some scenarios, optional step 912 is performed where the RFID tag reader outputs an indicator indicating that the first RFID tag has been successfully read.

Notably, the wearable object comprises a wristband and/or a glove. If the wearable object comprises a wristband, then the first antenna comprises a near-field antenna disposed on the wristband. If the wearable object comprises a wristband and a glove, then the first antenna comprises a far-field antenna disposed on a glove communicatively coupled to the wristband. The far-field antenna is backed by a reflective layer. If the wearable object comprises a glove, then the first antenna comprises a near-field antenna disposed on the glove so as to reside adjacent a person's dorsum of the hand when worn thereby.

Upon completing step 910 or 912, method 900 continues with steps 914-918. These steps involve: transmitting a second interrogation signal from a second antenna of the RFID tag reader; receiving a second response signal generated by and transmitted from a second RFID tag in response to the second interrogation signal; and processing the response signal to identify, locate or track a second object of interest. In this case, the second antenna comprises a far-field antenna disposed on the glove so as to reside adjacent a person's palm when worn thereby. The far-field antenna is backed by a reflective layer. Next, optional step 920 may be performed where the RFID tag reader outputs an indicator indicating that the second RFID tag has been successfully read. Subsequently, method 900 ends or other processing is performed (e.g., return to a previous step) in 922.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for reading Radio Frequency Identification ("RFID") tags, comprising:
    coupling a first wearable object directly to a hand of a person's first arm that comprises a first antenna for facilitating communication of signals between an RFID tag reader and the RFID tags which are within a first range of each other;
    coupling a second wearable object directly to a forearm of the person's first arm while the first wearable object is directly coupled to the hand of the person's first arm, the second wearable object comprising a second antenna for facilitating communication of signals between the RFID reader and the RFID tags which are within a second range of each other, the second range being different than the first range and the second wearable object being separate and distinct from the first wearable object;
    establishing a wired or wireless connection directly between the first and second wearable objects so as to electrically couple (a) the first antenna of the first wearable object to the RFID tag reader or (b) the second antenna of the second wearable object to the RFID tag reader, where only one of the first or second wearable objects comprises the RFID tag reader;
    transmitting a first interrogation signal from the first or second antenna;
    receiving, by the RFID tag reader of the first or second wearable object, a first response signal generated by and transmitted from a first RFID tag of the RFID tags in response to the first interrogation signal; and
    processing the first response signal to identify, locate or track a first object of interest to which the first RFID tag is attached.

2. The method according to claim 1, wherein the second wearable object comprises a wristband and the second antenna comprises a near-field antenna disposed on the wristband.

3. The method according to claim 1, wherein the first wearable object comprises a glove, the second wearable object comprises a wristband, and the first antenna comprises a far-field antenna disposed on the glove communicatively coupled to the wristband.

4. The method according to claim 3, wherein the far-field antenna is backed by a reflective layer.

5. The method according to claim 1, wherein the first wearable object comprises a glove and the first antenna comprises a near-field antenna disposed on the glove so as to reside adjacent a person's dorsum of a hand when worn thereby.

6. The method according to claim 1, further comprising:
    transmitting a second interrogation signal from the first antenna;
    receiving, by the RFID tag reader, a second response signal generated by and transmitted from a second RFID tag of the RFID tags in response to the second interrogation signal; and
    processing the response signal to identify, locate or track a second object of interest;
    wherein the first antenna comprises a far-field antenna disposed on a glove so as to reside adjacent a person's palm when the first wearable object is worn thereby and radiating outward from the palm.

7. The method according to claim 6, wherein the far-field antenna is backed by a reflective layer.

8. The method according to claim 1, further comprising performing operations by the RFID tag reader to output an indicator indicating that the first RFID tag has been successfully read.

9. A method for reading Radio Frequency Identification ("RFID") tags, comprising:
    coupling at least one of a wristband to a person's forearm and a glove directly to the person's hand, the wristband comprising a first antenna for facilitating communications of signals between an RFID tag reader and the RFID tags which are within a first range of each other, and the glove comprising a second antenna for facilitating communication of signals between the RFID tag reader and the RFID tags which are within a second range of each other, the second range being different than the first range, and the wristband being separate and distinct from the glove;

establishing a wired or wireless connection directly between the first and second wearable objects so as to electrically couple (a) the first antenna of the wristband to the RFID tag reader or (b) the second antenna of the glove to the RFID tag reader, where only one of the wristband and glove comprises the RFID tag reader;

transmitting an interrogation signal from the RFID tag reader;

receiving, by the RFID tag reader, a response signal generated by and transmitted from an RFID tag of the RFID tags in response to the first interrogation signal; and processing the response signal to identify, locate or track a first object of interest to which the RFID tag is attached.

10. The method according to claim 9, wherein the first or second antenna comprises a far-field antenna that is backed by a reflective layer.

11. A system, comprising:
a Radio Frequency Identification ("RFID") tag reader;
a first wearable object coupled directly to a hand of a person's arm that comprises a first antenna facilitating signal communications between the RFID tag reader and RFID tags which are within a first range of each other;
a second wearable object coupled directly to a forearm of the person's arm while the first wearable object is directly coupled to the hand of the person's arm, the second wearable object comprising a second antenna facilitating signal communications between the RFID tag reader and the RFID tags which are within a second range of each other, the second range being different than the first range and the second wearable object being separate and distinct from the first wearable object; and
a wired or wireless connection established between directly between the first and second wearable objects so as to electrically couple (a) the first antenna of the first wearable object to the RFID tag reader or (b) the second antenna of the second wearable object to the RFID tag reader, where only one of the first and second wearable objects comprises the RFID tag reader;
wherein the RFID tag reader is configured to
transmit a first interrogation signal from the first or second antenna,
receive a first response signal generated by and transmitted from a first RFID tag of the RFID tags in response to the first interrogation signal, and
process the first response signal to identify, locate or track a first object of interest.

12. The system according to claim 11, wherein the second wearable object comprises a wristband and the second antenna comprises a near-field antenna disposed on the wristband.

13. The system according to claim 11, wherein the first wearable object comprises a glove, the second wearable object comprises a wristband, and the first antenna comprises a far-field antenna disposed on the glove.

14. The system according to claim 13, wherein the far-field antenna is backed by a reflective layer.

15. The system according to claim 11, wherein the first wearable RFID tag reader comprises a glove.

16. The system according to claim 11, wherein the RFID tag reader is further configured to:
transmit a second interrogation signal from the first or second antenna;
receive a second response signal generated by and transmitted from a second RFID tag of the RFID tags in response to the second interrogation signal; and
process the response signal to identify, locate or track a second object of interest;
wherein the first antenna comprises a far-field antenna disposed on a glove so as to reside adjacent a person's palm when worn thereby and radiating outward from the palm.

17. The system according to claim 16, wherein the far-field antenna is backed by a reflective layer.

18. The system according to claim 11, wherein the RFID tag reader is further configured to output an indicator indicating that the first RFID tag has been successfully read.

19. A system, comprising:
a Radio Frequency Identification ("RFID") tag reader;
a first wearable object comprising (a) a wristband to be coupled directly to a forearm of a person's arm and (b) a first antenna for facilitating signal communications between the RFID tag reader and the RFID tags which are within a first range of each other;
a second wearable object comprising (a) a glove to be coupled directly to a hand of the person's arm and (b) a second antenna for facilitating signal communications between the RFID tag reader and the RFID tags which are within a second range of each other, the second range being different than the first range;
a wired or wireless connection established between directly between the first and second wearable objects so as to electrically couple (a) the first antenna of the first wearable object to the RFID tag reader or (b) the second antenna of the second wearable object to the RFID tag reader, where only one of the first and second wearable objects comprises the RFID tag reader;
wherein the RFID tag reader is configured to
transmit a first interrogation signal from the first or second antenna,
receive a first response signal generated by and transmitted from a first RFID tag of the RFID tags in response to the first interrogation signal, and
process the first response signal to identify, locate or track a first object of interest; wherein the first antenna comprises a near-field antenna disposed on the wristband, and the second antenna comprises (a) a near-field antenna disposed on the glove so as to reside adjacent the person's dorsum of a hand when worn thereby or (b) a far-field antenna disposed on the glove so as to be adjacent the person's palm when worn thereby.

20. The system according to claim 19, wherein the far-field antenna is backed by a reflective layer.

* * * * *